June 6, 1939.   A. D. PAULL   2,161,190
APPARATUS FOR MEASURING CHARGES OF POWDERED AND GRANULAR MATERIALS
Filed Jan. 28, 1938   2 Sheets-Sheet 1
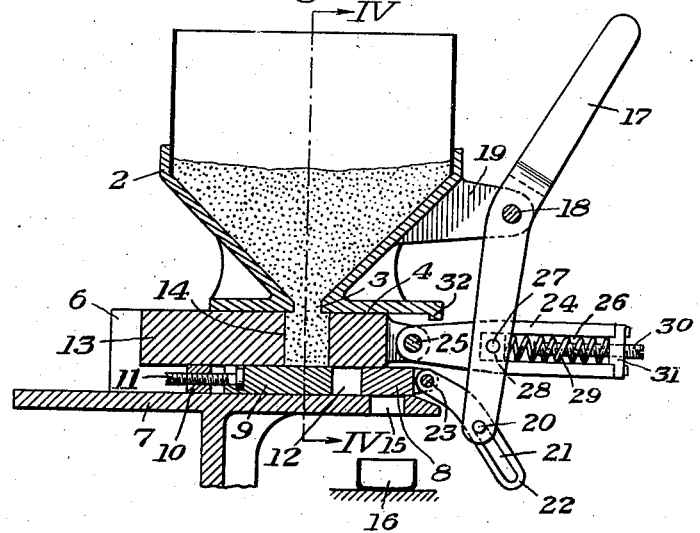
INVENTOR
*Ambrose D. Paull*
by his attorneys June 6, 1939.   A. D. PAULL   2,161,190
APPARATUS FOR MEASURING CHARGES OF POWDERED AND GRANULAR MATERIALS
Filed Jan. 28, 1938   2 Sheets-Sheet 2
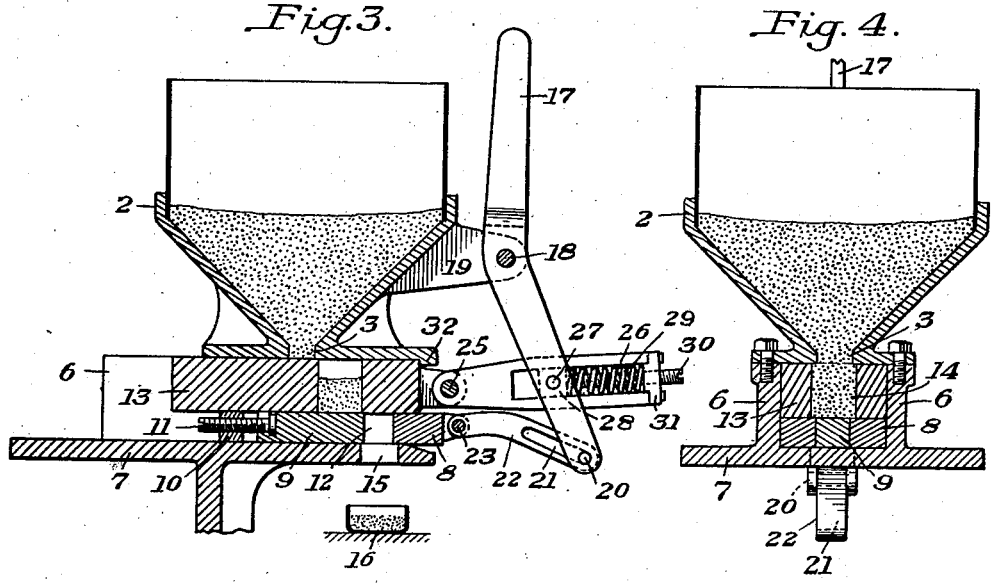
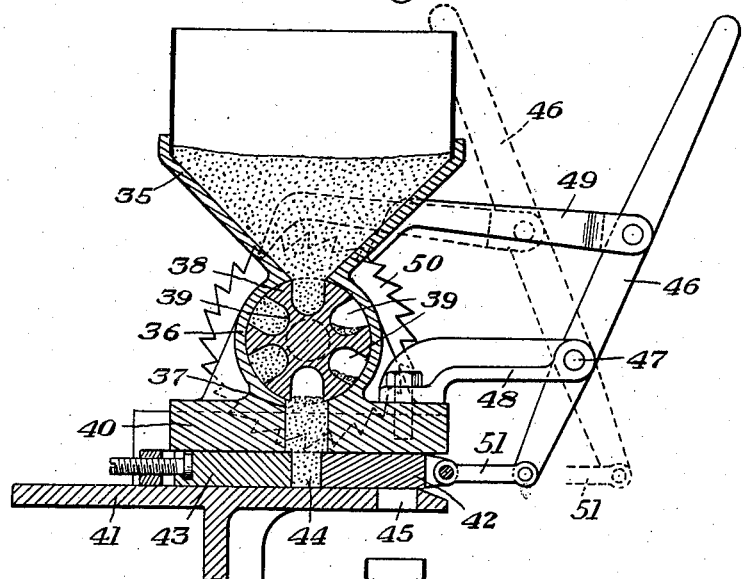
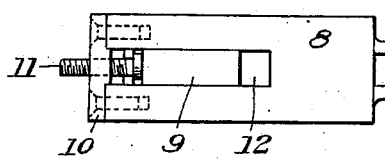
INVENTOR
Ambrose D. Paull
by his attorneys Patented June 6, 1939

2,161,190

UNITED STATES PATENT OFFICE 2,161,190

APPARATUS FOR MEASURING CHARGES OF POWDERED AND GRANULAR MATERIALS

Ambrose D. Paull, Wheeling, W. Va., assignor to Wheeling Stamping Company, Wheeling, W. Va., a corporation of West Virginia Application January 28, 1938, Serial No. 187,418

11 Claims. (Cl. 221—104)

This invention relates to the dispensing of measured amounts of dry powdered or granular materials from a much larger bulk and is for an apparatus wherein small charges of uniformly regular amounts may be measured out.

In the production of small articles from resinous materials, as for example the making of Bakelite bottle caps from the potentially reactive resin producing powder, considerable variation in the production results from the fact that according to present methods of measuring out the charges of dry powder considerable variation occurs between successive charges. Likewise, in the measuring of explosive powders for use in filling cartridges considerable variations occurs in successive charges measured out from the same filling or measuring device. Likewise in various other applications irregularity of production results from irregularities occurring in the measuring of successive charges of material from a larger mass.

In the measuring of the dry powdered and granular materials up to the present time it is common in most types of machines provided for the purpose to allow the dry material to flow from a hopper to which it is supplied in bulk into some form of measuring receptacle or cavity which is moved into position under the hopper and then moved out from under the hopper. Variation results from the fact that as the level of the material in the hopper changes the material in the receiving cavity is compacted with greater or less pressure and the material received into the measuring cavity will be more or less dense, depending upon these variations of pressure.

The present invention has for its purpose to provide an apparatus wherein variations resulting from changes in pressure, as above described, are minimized and wherein successive charges are produced with much more uniformity than heretofore. While the invention has been specifically mentioned as being applicable to the measuring of potentially reactive resin-forming materials and to explosive powders this is merely typical of uses for which the invention is designed and the invention is applicable for use in the measuring of various chemical and other batch materials where it is desired to produce measured charges wherein the tolerance and variation between successive charges is to be closely controlled. The invention may be readily understood by reference to the accompanying drawings which illustrate certain simple embodiments of my invention and of which Figure 1 represents a longitudinal section through an apparatus embodying my invention with the parts in an initial or starting position;

Figure 2 is a view similar to Figure 1 showing the parts moved to a second position in the operation of the machine;

Figure 3 is a view similar to Figures 1 and 2 but with the parts advanced to still another position;

Figure 4 is a transverse section in the plane of line IV—IV of Figure 1;

Figure 5 is a view similar to Figure 2 of a slightly modified arrangement; and

Figure 6 is a perspective view showing one form of a measuring slide forming a part of the apparatus illustrated in the preceding figures.

Referring to Figures 1 to 4 and Figure 6, 2 designates a hopper having an inclined bottom in which is a discharge orifice 3, and at each side of the orifice 3 the base of the hopper provides a flat slide engaging surface 4. As shown in Figure 4, the hopper is supported on parallel upstanding flanges 6 on a base member 7. Mounted on the base member 7 between the upstanding flanges 6 is a measuring slide designated generally as 8. This slide comprises a flat bifurcated plate member, best shown in Figure 6, having an adjustable block 9 in the bifurcation thereof, there being a cross piece 10 bolted to the bifurcated end. A set screw 11 threaded through the piece 10 and having a flanged head engaging a suitable socket in the block 9 enables the block to be adjusted lengthwise of the bifurcation in the slide plate 8. There is thus formed in the plate 8 an adjustable material receiving cavity 12. The plate 8 and the supporting plate 7 are machined for the plate 8 to slide on the member 7. Also positioned between the upright flanges 6 and resting on the top of the measuring slide 8 is a second slide plate 13, the bottom of which rests on the plate 8 and the top of which bears against the flat surfaces 4 on the under side of the base of the hopper. The plate 13 is provided with a material receiving cavity 14 which is larger than the cavity 12 in the measuring slide 8. While the cavity 14 is larger than the cavity 12 it is only moderately larger and its capacity is very much less than the capacity of the hopper. In use the parts are initially in the position shown in Figure 1 wherein the material receiving cavity 4 in the plate 13 registers with the orifice 3 in the bottom of the hopper while the bottom of the cavity 14 is closed by the measuring slide 8. Material may flow from the hopper 2 into the receiving cavity 14 when the parts are in this position. The plate 13 is then moved in a horizontal plane relatively to the opening 3 in the hopper so as to cut off further flow of material from the opening 3 and then bring the cavity 14 into register with the receiving cavity 12 in the measuring slide 8. In this position sufficient material falls from the cavity 14 into the cavity 12 to fill the cavity 12 and the material will not be compacted in the cavity 12 by any considerable weight of overlying material. While the material will charge from the hopper into the cavity 14 under a variable pressure, depending on the depth to which the hopper is filled, it can discharge from the cavity 14 into the cavity 12 only under the head or weight of the small column in the cavity 14. Any variation in the weight of this column by reason of the cavity 14 having been filled under conditions of maximum or minimum pressure is so small as to exert no practical difference in the charging of the material into the cavity 12. After the parts have been brought to the position shown in Figure 2 to allow the cavity 12 to be filled, the measuring slide is then moved out of register with the cavity 14 to a point of discharge. In the apparatus shown discharge is effected by advancing the measuring slide 8 over the supporting plate 7 to a point where the receiving cavity 12 registers with an opening 15 in the plate 7. At this time the cavity 12 is out of register with the cavity 14 and the measured charge of material drops through the opening 15 into any suitable receptacle such as that indicated at 16.

While the operation of the slides may be effected by any suitable mechanism, I have for the purpose of illustration only shown one form of mechanism for operating the slides. The mechanism illustrated comprises a hand lever 17, pivotally supported at 18 on a bracket 19 secured to the hopper. The upper end of the lever 17 comprises an operating handle. At the lowermost end of the lever is a pin 20 engaging in a slot 21 in a link 22, pivotally connected to the measuring slide 8 at 23. A link 24 is pivotally connected at 25 to the intermediate slide 13. The outer end of this link is bifurcated as indicated at 26, and a pin 27 on the lever engages a slide block 28 which is movable along the bifurcated portion of the link. This movement is resisted by a compression spring 29 and a bolt 30 threaded through a cross member 31 on the end of the link 24 provides an adjustable abutment for limiting the sliding movement of the block 28 along the bifurcation of the link. At the right hand end of the base portion 4 of the hopper is a depending lip or abutment 32 adapted to limit the travel of the intermediate slide 13 in a direction toward the right as viewed in Figure 1.

In the operation of this mechanism the operator starting with the lever shown in position in Figure 1 pushes it toward the left, causing the lower end to move toward the right. In the initial movement of the lever the pin 20 on the lowermost end of the lever slides freely in the slot 21 of the link 22 so that the measuring slide 8 remains stationary. Pressure is transmitted through the block 28 and the spring 29 to the link 24, causing the intermediate slide 13 to move to the position shown in Figure 2. At the time the intermediate slide 13 engages the abutment 32 the pin 20 will have completed its free travel in the slot 21 and further movement of the lever will cause the spring 29 to be compressed while the plate 13 remains stationary and cause the measuring slide 8 to move to the right as viewed in Figure 2 to the position shown in Figure 3 where the cavity 12 registers with the discharge opening 15. Upon movement of the lever 17 in the opposite direction the compression of the spring 29 will first be relieved and the intermediate slide 13 will be moved toward the left while the pin 20 moves along the slot 21 and after the pin 20 has completed its free movement in the slot 21 the measuring slide will be returned to its normal position and the parts will again be in the starting position shown in Figure 1.

As hereinbefore stated, this linkage arrangement for moving and operating the slides is merely illustrative of one mechanism that may be employed.

Figure 5 illustrates a modified form of apparatus utilizing the same general principles as embodied in the arrangement hereinbefore described. In this figure the hopper is designated 35. It is provided with a discharge throat 36 in which is a cylindrical chamber below which there is a material receiving cavity 37 of relatively small capacity but larger than that required to hold the measured amount of material. It corresponds in function to the cavity 14 of the intermediate slide 13 of the construction shown in Figure 1. In the cylindrical chamber in the throat 36 at the bottom of the hopper is a pocket wheel or drum 38 having a series of pockets or cavities 39 in its periphery. The cavity 37 is formed in a base member 40 supported above a flat plate 41. There is a measuring slide plate 42 similar in all respects to that shown in Figure 6, this slide plate having an adjustable block 43 similar to the adjustable block 9 and being provided with an adjusting mechanism similar to that described. A measuring cavity in the measuring slide 42 is designated 44.

In the operation of this modification the plate 42 normally occupies a position where the cavity 44 is out of register with the cavity 37. Material is carried around by the pockets 39 in the drum 38 from the bottom of the hopper and allowed to fall into the cavity 37. If the cavity 37 is full, excess material will be carried on around as indicated in Figure 5. At the proper time the measuring slide 42 is operated to bring the cavity 44 into register with the cavity 37, allowing the material to fall from the cavity 37 into the cavity 44 after which the plate 42 is moved to the right as viewed in Figure 5 to simultaneously close the bottom of the cavity 37 and bring the measuring cavity 44 over discharge opening 45 in the supporting plate 41.

This modification shows another arrangement wherein the material from the hopper is delivered to a transfer or intermediate cavity and falls from such cavity into a measuring receptacle under such a small head of pressure that minute variations that might exist have no practical disadvantage. For operating the mechanism shown in Figure 5, I have shown a hand lever 46 pivotally supported at 47 to a ratchet 48. The lever 46 is provided with a pawl at 49 that engages a ratchet-wheel 50 to turn the drum 38 a predetermined distance with each movement of the lever 46. The lowermost end of the lever 46 is connected through a link 51 with the measuring slide 42.

In the use of my invention the dry bulk material in either powdered or granular form is charged as required into the hopper and through the use of the apparatus described, dispensed in measured amounts and no appreciable variation results in the successive amounts so measured out by reason of the variations in the density of the material resulting from variations in the depth of material in the hopper because of the fact that the pressure in the hopper cannot be transmitted to the measuring device and the material falls into the measuring device under a substantially uniform head of pressure.

While I have illustrated and described certain specific embodiments of my invention it will be understood that this was merely by way of illustration and that various changes and modifications are contemplated.

I claim:

1. Apparatus for measuring out charges of dry granular or powdered material comprising a hopper, means for receiving the exact amount of material required, and means interposed between the hopper and the first means for receiving material from the hopper and delivering it to the first means, said second means having a capacity greater than the first, whereby said second means may hold a supply of material in excess of the capacity of the first, said first and second means being relatively movable into and out of register, and means for interrupting communication between said second means and the hopper at all times when the second means is delivering material to the first, whereby the pressure of the volume of material in the hopper may not be transmitted to the material being charged into the said first means.

2. Apparatus of the class described comprising a hopper, a measuring device, and an intermediate means having a cavity for receiving material from the hopper and discharging it into the measuring device and also having means to interrupt any direct flow of material from the hopper to the measuring device, said intermediate member having a unit capacity greater than that of the measuring device, whereby it may always receive from the hopper more material than is required by the measuring device, the measuring device and the intermediate means being relatively movable into and out of position where material from the latter flows directly into the former.

3. Apparatus of the class described comprising a hopper for holding material, a measuring member having a cavity therein adapted to receive material to be measured out, and means intermediate the hopper and the measuring member for receiving material from the hopper and delivering it to the material in the measuring member, and means operable at all times when the measuring member is receiving material from the said intermediate means to interrupt any direct communication between the hopper and measuring member, whereby the pressure of material in the hopper is never transmitted to material in the measuring member.

4. Apparatus of the class described comprising a hopper, means having a material receiving cavity therein for receiving material from the hopper, and a measuring member having a cavity therein movable into and out of register with the cavity in said means, the cavity in the said means having a capacity somewhat greater than the cavity in the measuring member, and means for preventing the direct flow of material from the hopper through the cavity in the first means to the cavity in the measuring member.

5. Apparatus of the class described comprising a hopper, a measuring receptacle, and means interposed between the hopper and measuring receptacle for receiving material from the hopper and having a cavity for holding a mass of material slightly more than sufficient to fill the measuring receptacle, said means and the measuring receptacle being relatively movable in a horizontal plane in such manner as to bring the measuring receptacle into and out of register with said interposed means, and means for preventing at any time the direct flow of material from the hopper through the receiving means into the measuring receptacle.

6. Apparatus of the class described comprising a hopper, a measuring receptacle, and means having a receiving cavity interposed between the hopper and measuring receptacle, which cavity receives material from the hopper and has a capacity such that it holds a mass of such material more than sufficient to fill the receptacle, both the measuring receptacle and said means being movable in a horizontal plane relatively to each other and relatively to the hopper.

7. Apparatus of the class described comprising a hopper having a discharge passage leading therefrom, a measuring device having a cavity therein adapted to hold a predetermined amount of material, and means interposed between the discharge of the hopper and the measuring device having a cavity therein adapted to receive material from the hopper and having a capacity such as to hold a volume of material greater than that which will fill the cavity in the measuring device, said means and said measuring device being relatively movable whereby the cavity in the measuring device may be brought into register with the cavity in said means and whereby it may be moved out of register, and means for interrupting the free flow of material from the hopper into the cavity in said interposed means at all times when the cavity in the measuring device is registering with the cavity in said interposed means.

8. Apparatus of the class described comprising a hopper having a discharge passage leading therefrom, a measuring device having a cavity therein adapted to hold a predetermined amount of material, and means interposed between the discharge of the hopper and the measuring device having a cavity therein adapted to receive material from the hopper and of a capacity such as to hold a volume of material greater than that which will fill the cavity in the measuring device, said means and said measuring device being relatively movable whereby the cavity in the measuring device may be brought into register with the cavity in said means and whereby it may be moved out of register, and means for interrupting the free flow of material from the hopper into the cavity in said interposed means at all times when the cavity in the measuring device is registering with the cavity in said interposed means, the measuring device being supported on another member which provides a closure for the cavity in the measuring device, said measuring device and said other member being relatively movable to effect an opening of the cavity in the measuring device.

9. Apparatus of the class described comprising a hopper having a discharge opening, a slide plate under the hopper having a cavity passing therethrough, a second slide plate under the first also having a cavity therein, said slide plates being relatively movable to bring the cavities into register, and means for preventing the flow of material from the hopper into the cavity of the first plate at any time when said cavity is in register with the cavity in the second plate.

10. An apparatus of the class described comprising a hopper having a discharge opening therein, a slide plate movable against the bottom of the hopper having an opening adapted to be brought into register with the opening in the bottom of the hopper to receive material from the hopper and being movable to a position where the slide plate closes the hopper against the flow of material therefrom, a second slide plate under the first having a cavity therein of less capacity than the one in the first slide plate, said second slide plate being movable to bring the cavity therein into and out of register with the cavity in the first, and means for operating the slide plates in such manner that material is first delivered from the hopper into the cavity of the first slide and then is delivered from the cavity in the first slide to the cavity in the second slide only at a time when the flow of material from the hopper to the cavity in the first slide is cut off.

11. Apparatus of the class described comprising a hopper having a discharge passage leading therefrom, means under the hopper providing a receptacle of limited capacity, a slide plate under said means normally forming a closed bottom for the receptacle therein but having a cavity therein adapted to be moved into register with the receptacle in said means to receive material therefrom, the capacity of the cavity in the slide plate being less than the capacity in said receptacle, said means under the hopper having a part which extends across the bottom of the hopper for interrupting the free flow of material from the hopper to the receptacle at any time when the receptacle is delivering material to the cavity.

AMBROSE D. PAULL.